US008185488B2

(12) United States Patent
Chakravarty et al.

(10) Patent No.: US 8,185,488 B2
(45) Date of Patent: May 22, 2012

(54) SYSTEM AND METHOD FOR CORRELATING EVENTS IN A PLUGGABLE CORRELATION ARCHITECTURE

(75) Inventors: Dipto Chakravarty, Potomac, MD (US); Usman Choudhary, Springfield, VA (US); John Melvin Antony, Herndon, VA (US); Michael Howard Cooper, Washington, DC (US); Jason Lee Arrington, Herndon, VA (US); Cheryl Witt, Alexandria, VA (US)

(73) Assignee: EMC Corporation, Hopkinton, MA (US)

( * ) Notice: Subject to any disclaimer, the term of this patent is extended or adjusted under 35 U.S.C. 154(b) by 1070 days.

(21) Appl. No.: 12/081,540

(22) Filed: Apr. 17, 2008

(65) Prior Publication Data

US 2009/0265288 A1    Oct. 22, 2009

(51) Int. Cl.
*G06F 17/00* (2006.01)
*G06N 5/02* (2006.01)
(52) U.S. Cl. ........................................................ 706/47
(58) Field of Classification Search .................. None
See application file for complete search history.

(56) References Cited

U.S. PATENT DOCUMENTS

| | | | | |
|---|---|---|---|---|
| 5,630,069 | A | 5/1997 | Flores et al. ................... | 395/207 |
| 5,657,245 | A | 8/1997 | Hecht et al. ................... | 364/505 |
| 6,205,407 | B1 | 3/2001 | Testa et al. .................... | 702/119 |
| 6,208,720 | B1 | 3/2001 | Curtis et al. ................... | 379/114 |
| 6,618,766 | B1 | 9/2003 | Eshghi .......................... | 709/318 |
| 6,779,120 | B1 | 8/2004 | Valente et al. ................. | 713/201 |
| 6,792,456 | B1 | 9/2004 | Hellerstein et al. ........... | 709/224 |
| 6,807,583 | B2 | 10/2004 | Hrischuk et al. .............. | 709/318 |
| 6,839,850 | B1 | 1/2005 | Campbell et al. ............. | 713/201 |
| 6,850,820 | B2 | 2/2005 | Tajima .......................... | 700/286 |
| 6,886,102 | B1 | 4/2005 | Lyle .............................. | 713/201 |
| 6,983,221 | B2 | 1/2006 | Tracy et al. ................... | 702/181 |
| 7,051,125 | B1 * | 5/2006 | Flott et al. ...................... | 710/52 |
| 7,065,493 | B1 | 6/2006 | Homsi ............................. | 705/8 |
| 7,302,674 | B1 | 11/2007 | Gladieux et al. .............. | 717/101 |
| 7,324,108 | B2 | 1/2008 | Hild et al. ..................... | 345/440 |
| 7,379,999 | B1 | 5/2008 | Zhou et al. .................... | 709/224 |
| 7,444,395 | B2 | 10/2008 | Sanghvi et al. ............... | 709/223 |
| 7,457,872 | B2 | 11/2008 | Aton et al. .................... | 709/224 |
| 7,565,643 | B1 | 7/2009 | Sweet et al. .................. | 717/121 |
| 7,624,396 | B1 | 11/2009 | Isenberg ....................... | 719/314 |

(Continued)

OTHER PUBLICATIONS

Chen et al. "Complex Event Processing using Simple Rule-based Event Correlation Engines for Business Performance Management", CEC/EEE, 2006, pp. 8.*

*Primary Examiner* — Jeffrey A Gaffin
*Assistant Examiner* — Li-Wu Chang
(74) *Attorney, Agent, or Firm* — Barry N. Young

(57) ABSTRACT

A system for pluggable event correlation may include an input manager that receives a plurality of events and converts the events into a format compatible with one or more of a plurality of correlation engines. The correlation engines may then evaluate the converted events using various rules and generate correlated events when the evaluated events trigger at least one of the rules. An action manager may execute remedial actions when the correlation engines generate the correlated events. Moreover, extensibility may be provided by enabling a user to define rules to be triggered when events occur in a predetermined pattern, and actions to be executed when a predetermined rule triggers a correlated event. Further, to plug a new correlation engine into the system, adapters may be deployed to handle input and output, while the user-defined rules may be validating according to semantic requirements of the new correlation engine.

9 Claims, 2 Drawing Sheets

U.S. PATENT DOCUMENTS

| | | | |
|---|---|---|---|
| 7,673,335 B1 | 3/2010 | Chakravarty et al. | 726/11 |
| 7,707,133 B2 * | 4/2010 | Das et al. | 706/50 |
| 7,899,935 B2 | 3/2011 | Zhu et al. | 709/246 |
| 7,926,099 B1 | 4/2011 | Chakravarty et al. | 726/13 |
| 7,984,452 B2 | 7/2011 | Chakravarty et al. | 719/318 |
| 2001/0051937 A1 * | 12/2001 | Ross et al. | 706/47 |
| 2002/0087220 A1 | 7/2002 | Tveit et al. | 700/22 |
| 2002/0111755 A1 | 8/2002 | Valadarsky et al. | 702/58 |
| 2002/0111824 A1 | 8/2002 | Grainger | 705/1 |
| 2002/0138605 A1 | 9/2002 | Hole | 709/224 |
| 2002/0173997 A1 | 11/2002 | Menard et al. | 705/7 |
| 2003/0135378 A1 | 7/2003 | Carlson et al. | 705/1 |
| 2003/0172166 A1 | 9/2003 | Judge et al. | 709/229 |
| 2004/0010709 A1 | 1/2004 | Baudoin et al. | 713/201 |
| 2004/0015497 A1 | 1/2004 | Swarna et al. | 707/6 |
| 2004/0138970 A1 | 7/2004 | Ramachandran et al. | 705/34 |
| 2004/0139166 A1 | 7/2004 | Collison | 709/207 |
| 2005/0005017 A1 | 1/2005 | Ptacek et al. | 709/229 |
| 2005/0086502 A1 | 4/2005 | Rayes et al. | 713/189 |
| 2005/0160134 A1 | 7/2005 | Childress et al. | 709/200 |
| 2005/0222811 A1 | 10/2005 | Jakobson et al. | 702/183 |
| 2005/0262215 A1 | 11/2005 | Kirov et al. | 709/207 |
| 2006/0015603 A1 * | 1/2006 | Jakobson et al. | 709/223 |
| 2006/0036713 A1 * | 2/2006 | Araujo et al. | 709/220 |
| 2006/0116913 A1 | 6/2006 | Hansan et al. | 705/4 |
| 2006/0130070 A1 | 6/2006 | Graf | 719/318 |
| 2007/0047439 A1 | 3/2007 | An et al. | 370/231 |
| 2007/0180490 A1 | 8/2007 | Renzi et al. | 726/1 |
| 2007/0192853 A1 | 8/2007 | Shraim et al. | 726/22 |
| 2007/0192862 A1 | 8/2007 | Vermeulen et al. | 726/23 |
| 2008/0016502 A1 | 1/2008 | Henderson et al. | 717/143 |
| 2008/0047009 A1 | 2/2008 | Overcash et al. | 726/23 |
| 2011/0173359 A1 | 7/2011 | Chakravarty et al. | 710/112 |

* cited by examiner

SYSTEM AND METHOD FOR CORRELATING EVENTS IN A PLUGGABLE CORRELATION ARCHITECTURE

FIELD OF THE INVENTION

The invention relates to a system and method for correlating events using rules and expressions associated with a plurality of event correlation engines and taking appropriate action to remediate threats and other incidents detected when the correlated events violate the rules and expressions associated with the plurality of event correlation engines.

BACKGROUND OF THE INVENTION

Organizations often have to sort through large amounts of data to ensure compliance with governmental regulations, internal controls or policies, risk strategies, or other security and compliance concerns. As a result, various systems exist to address correlation of data by applying logic or rules to analyze the data. However, existing correlation solutions tend to focus on ensuring compliance with specific controls, regulations, or other policies for which the correlation solutions were particularly tailored. Thus, in many cases, a given organization may have to deploy various different correlation engines to ensure compliance across distinct areas or organizational boundaries (e.g., separate correlation engines may be used to ensure compliance with policies for intrusion detection, data integrity, network security, regulatory compliance, internal policies, or other governance, security, and compliance policies).

Although many organizations require data correlation for various needs, existing systems tend to take a divide-and-conquer approach to correlation. Existing correlation solutions tend to only perform specific and isolated types of correlation, for example, thus falling short in providing a comprehensive and future-proof correlation solution. In particular, governmental regulations, internal risk management strategies, or security threats, among other things, may often change on an ongoing and dynamic basis, which may not be addressed adequately using correlation solutions that operate in isolation. With security and compliance only being as strong as a chain's weakest link, existing correlation solutions that perform singular types of correlation cannot provide an integrated, centralized, future-proof solution for real-time monitoring and remediation of security, governance, risk, and compliance.

Accordingly, existing correlation solutions do not provide a mechanism for a plurality of correlation engines to perform various types of correlation on a stream of data. As a result, even when an organization employs best-in-breed correlation solutions for various correlation needs, the lack of interoperability or intercommunication may prevent the various correlation solutions from ensuring system-wide compliance. Furthermore, when multiple correlation solutions operate in isolation of one another, they may be prevented from cooperating with one another to refine precision, instead relying solely on internal logic for functionality.

Existing systems suffer from these and other problems.

SUMMARY OF THE INVENTION

According to various aspects of the invention, a system and method for pluggable event correlation may address these and other drawbacks of existing systems. For example, the invention provides an integrated correlation framework that can improve incident management and remediation by streamlining event management and supporting multiple languages and correlation platforms, among other things. The correlation framework may gather and correlate event information from across an organizational networked infrastructure, including data from various systems, devices, and applications, including those of third-party vendors. Accordingly, the correlation framework enables rigorous and secure event and threat management by providing a single, real-time view of governance, risk, and compliance activity, irrespective of which languages or platforms an organization uses.

According to various aspects of the invention, the pluggable correlation framework may provide heuristic, statistical correlation among a plurality of correlation engines to refine precision of various forms of correlation (e.g., the framework may integrate distinct correlation engines for ensuring compliance with government regulations, preventing and deterring security threats to an organization, verifying and validating business and policy controls, etc.). As a result, the pluggable correlation framework may transcend correlation for information technology security, providing a comprehensive correlation solution for various aspects of an organizational infrastructure. As such, the pluggable correlation framework can provide a future-proof correlation solution, in which correlation engines can be swapped in or out, or in which rules, expressions, and associated actions can be added or otherwise modified incrementally as new requirements or threats may arise.

The pluggable correlation framework provides a runtime environment, which hosts various common, reusable services that can be shared among multiple correlation engines, each of which may use particular algorithms to analyze event data (e.g., an application program interface may be exposed to enable input and output adapters to be developed or otherwise provided for the various correlation engines). The service-oriented design may provide an extensible platform for contextual evaluation of event data, enabling custom rules, expressions, and associated actions to be defined for the correlation engines hosted in the runtime environment (e.g., a role-based correlation engine may detect patterns of illegal or prohibited user activities, while an asset-based correlation engine may look for patterns identifying policy violations of particular assets).

The framework may receive events from a real time event stream, and multiple correlation engines hosted within the runtime may collectively evaluate the events in view of evaluation logic associated therewith (e.g., rules or expressions that the engines use to analyze events). For example, when one or more correlation engines determine that evaluation criterion have occurred for a given rule or expression, (e.g., when a given pattern or statistical threshold has been met), the engines may trigger the rule to generate a "correlated event," and one or more actions associated with the correlated events may be executed in response.

To support the plurality of correlation engines, including third-party correlation engines, the pluggable correlation runtime may include an exposed application program interface for defining input adapters that can convert events from the event stream into an input format used by a given correlation engine. Furthermore, an output adapter may be defined through the exposed application program interface to convert outputs generated by the various correlation engines into "correlated events" that can be associated with actions in the system. To this end, the framework may further include a rule builder that can be used to create rules or expressions for the correlation engines deployed in the runtime environment. Associated actions may be defined for the rule to indicate how to respond when the rule triggers, generating a correlated event. Thus, the rules and associated actions may be deployed into the runtime environment, wherein the various correlation engines may evaluate the incoming event stream against the rules, and wherein the runtime may execute appropriate remedial action when one or more events cause the rules to trigger. Moreover, in various implementations, one or more of the generated correlated events may be provided back into the system to be correlated with additional events or correlated events in the event stream.

Other objects and advantages of the invention will be apparent to those skilled in the art based on the following drawings and detailed description.

DETAILED DESCRIPTION

Figure 1:
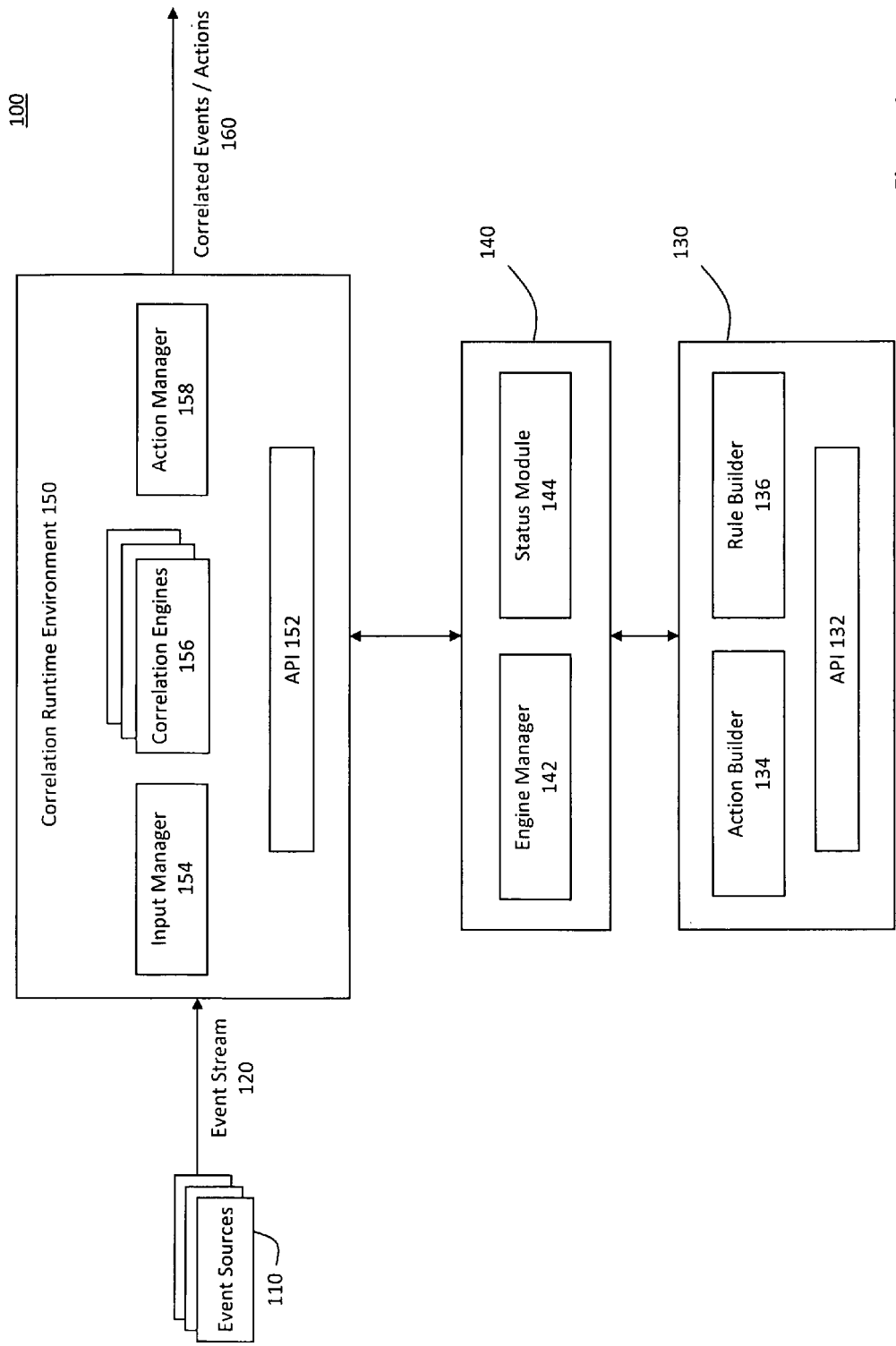
FIG. 1 illustrates a block diagram of an exemplary pluggable event correlation system according to various aspects of the invention.

According to various aspects of the invention, as illustrated in FIG. 1, for example, an exemplary pluggable event correlation system 100 provides an integrated framework for improving incident management and threat remediation. For example, the pluggable event correlation system 100 may include a correlation runtime environment 150 in which a plurality correlation engines 156 may be deployed to correlate events that originate from various event sources 110. As such, the pluggable event correlation system 100 may enforce internal policies, manage security risks, and ensure regulatory compliance across an organizational information technology infrastructure. Furthermore, various aspects of the invention may enable scalability and addition of future event correlation engines 156. For example, a new correlation engine 156 may be added to the correlation runtime 150 by configuring an input adapter and an output adapter to respectively convert events into a format compatible with the new engine 156 and normalize outputs generated by the new engine 156. Furthermore, an engine manager 142 associated with a management module 140 may be employed to start or stop the correlation engines 156, validate rules and expressions per semantics of the correlation engines 156, and otherwise configure the correlation engines 156 to enforce the rules and expressions.

According to various aspects of the invention, a configuration module 130 may expose an application program interface 132 to enable users to configure the correlation runtime 150. For instance, an action builder module 134 and a rule builder module 136 may be used to define various rules, expressions, and associated actions through the exposed application program interface 132. The defined rules and expressions may be deployed into the runtime environment 150 to configure operation of one or more of the correlation engines 156. Further, the defined actions may be deployed into the runtime environment 150 to configure response processes that an action manager 158 may execute when a rule or expression triggers in one or more of the correlation engines 156. For example, the rules may be defined through the rule builder 134 to address various governance, risk, or compliance factors (e.g., known threats, target vulnerabilities, criticalities of target assets, etc.), and remedial actions or responses may be defined through the action builder 132 to manage incident responses. Thus, using the rule builder 134, correlation rules and expressions may be defined based on various event patterns (e.g., using a rule wizard, or a rule programming language such as RuleLG), and the action builder 132 may be used to define appropriate actions to be taken when the rules or expressions trigger (e.g., using an action wizard or other interface for defining system actions).

The rules and expressions may generally represent patterns of events relating to potential risk factors or relationships among events. More particularly, the rules may include simple rules, aggregate rules, composite rules, and sequence rules, among other types of rules. Simple rules may include expressions specifying which events trigger the rule, such as intersected filtering expressions (e.g., using an "all" user interface option or an "AND" RuleLG operator), unjoined filtering expressions (e.g., using an "any" user interface option or an "OR" RuleLG operator), or other expressions, as will be apparent. An exemplary simple rule may be defined to trigger when an event occurs on a server on a critical list, or when an event of a severity greater than a predetermined threshold occurs. An aggregate rule may be defined to trigger when a subrule triggers a number of times in a time period. For example, an aggregate rule may be defined to trigger when the subrule triggers ten times in a five-minute period. Further, aggregate rules may include an optional field for defining a group criteria, which may be populated using any field used to enrich an event stream 120 in the runtime environment 150. For example, the aggregate rule defined above could further specify that each of the ten events must have a same destination server, an originating event source type, or other group criteria. A composite rule may be defined to trigger when all or a specified number of subrules trigger within a time period. Composite rules may also include the optional field for defining group criteria. A sequence rule may be defined to trigger when two or more subrules trigger in a specific order within a time period, and can also include the optional field for defining group criteria.

According to various aspects of the invention, the rules, expressions, and associated actions defined via the configuration module 130 may be deployed into the correlation runtime environment 150 through a management module 140. The management module 140 may include an engine management module 142 that provides various features for managing the correlation runtime 150. For example, the engine management module 142 may interface with the correlation runtime 150 to provide services for managing one or more of the plurality of correlation engines 156 (e.g., starting and stopping the correlation engines 156, configuring rules, expressions, and associated actions to be employed by the correlation engines 156, and validating rules, expressions, and associated actions according to semantics of the correlation engines 156).

The management module 140 may further include a status module 144 that provides reporting services to inform the user of statistics and other information associated with activity in the correlation runtime 150 (e.g., a number of events processed, an event processing rate, a number of rules that have fired, performance metrics, system health information, or other information relating to system health or status). The status module 144 may periodically poll the correlation runtime environment 150 to retrieve system information such as status, health, performance, or other system information. For example, each event source 110 may provide a report on status, health, or other information (e.g., accessibility to the data of an event source 110 may represent the health of a connection to that event source 110). The status module 144 may collect such information for presentation to the user, giving a comprehensive view into system-wide status and health.

According to various aspects of the invention, the correlation runtime environment 150 may include an input manager 154 for collecting events that originate at various ones of a plurality of event sources (e.g., network elements, databases, operating systems, directories, firewalls, intrusion detection systems, antivirus applications, mainframes, web servers, application servers, or other event-generating systems). The input manager 154 may enrich the incoming events, which may be collected via an event stream 120 received at the runtime environment 150. For example, the input manager may collect the events by parsing and normalizing events in the event stream 120, and the normalized events may be categorized according to a taxonomy that provides consistent information about events originating from what could otherwise be disparate or incompatible event sources 110. The input manager 154 may filter the categorized events to eliminate irrelevant data, and may further enrich the events using various meta-tag fields having relevance in a particular environment. For example, the input manager 154 may enrich the events by adding meta-tags that categorize events into groups, add business relevance through a policy-based taxonomy, or provide other information to describe an event (e.g., source address, destination address, event type, custom fields, or various other fields that can provide enriching information about an event). Furthermore, each event in the event stream 120 may be associated with a timestamp (e.g., to indicate when the event was generated by the event source, received at the runtime 150, etc.).

The input manager 154 may route events to the plurality of correlation engines 156, each of which may analyze the events in a particular format. As such, the correlation runtime environment 150 may expose an application program interface 152 for developing input adapters that can be used by the input manager 154 to convert events into the formats of the various correlation engines 156. Each of the correlation engines 156 may then correlate the events in a manner driven by a plurality of rules or expressions that indicate when a given condition has occurred. The rules employed by a given correlation engine 156 may include predefined rules (e.g., an intrusion detection correlation engine may include predefined network security rules, while a compliance correlation engine may include predefined regulatory rules), user-defined rules (e.g., defined via the rule builder 134), or various combinations of user-defined rules and rules associated with other correlation engines 156.

When one of the correlation engines 156 determines that a rule has been triggered, the correlation engine 156 may generate a "correlated event." A network administrator, for example, may define a custom rule to generate a correlated event when unauthorized use of a particular resource by a system user occurs. In another example, by combining rules from one or more of the plurality of correlation engines 156, correlated events may be generated on a statistical, heuristic basis (e.g., a correlated event generated by a first correlation engine 156 can be provided as an input to one or more further correlation engines 156). Furthermore, rules may be based on one or more contexts, including role-based contexts (e.g., patterns of unauthorized user activity), an asset-based context (e.g., policy violations for certain assets), or various other contexts that may have business relevance. Rules may also use an event taxonomy, which allows scalability across multiple platforms, as different vendors may use different event names for similar events (e.g., a "failed login" in a UNIX environment may be equivalent to an "unsuccessful logon" in a Windows™ environment). Cross-vendor or vendor-independent rules may thus be created using a standardized event taxonomy based on common elements of events in the event stream 120.

Various ones of the correlation engines 156 may be coupled to a set of dynamic lists that can be referenced when correlating events against rules. The dynamic lists may generally include distributed list structures for storing and searching for one or more elements. For example, a dynamic list may store a set of strings such as Internet Protocol addresses, server names, user names, or various other strings. Elements in the dynamic list may be marked as transient or persistent, wherein transient elements may be automatically removed from the list following a predetermined time-to-live (TTL) period, while persistent elements may remain in the list unaffected by the time-to-live period. Exemplary dynamic lists may include terminated users, suspicious users to watch, privileged users to watch, authorized ports and services, authorized servers, or other lists. The correlation engines 156 may thus reference one or more of the dynamic lists when evaluating rules or expressions. For example, a correlation engine 156 may reference a dynamic list of authorized users when evaluating a rule that triggers when a file access event originates from a user who does not have an entry in the list of authorized users. Additionally, actions to be taken by the action manager 158 in response to a rule triggering may be integrated with the dynamic lists (e.g., elements may be added or removed from a list when a given rule triggers).

When a rule triggers, causing one of the correlation engines 156 to generate a correlated event, an output adapter associated with the correlation engine 156 may normalize the output for further processing by the action manager 158. As the various correlation engines 156 may generate correlated events in distinct formats, the exposed application program interface 152 can be used to provide output adapters that convert the correlated events from the format associated with the generating correlation engine 156 into a format compatible with the action manager 158. The action manager 158 can then identify one or more actions defining how to respond to the rule triggering. Actions and their associated rules may be predefined by the correlation runtime 150 or the correlation engines 156, user-defined through the action builder 132, or various combinations thereof. For example, a rule detecting an unauthorized network intrusion may be associated with an action to block a port of entry or deny access to an offending node. In another example, a rule detecting five failed logins by a user within two minutes may be associated with to an action to temporarily disable the user's account and add the user to a list of suspicious users to watch. In still another example, a high-severity event from a server brought online within the past ten days may be associated with an action that alerts appropriate administrators that the server may need attention or maintenance. In other instances, the action manager 158 may determine that no action need be taken for a given correlated event, where the correlated event may simply be logged for future reference or forwarded to other interested entities (e.g., another one of the correlation engines 156). Accordingly, the action manager 158 can determine what actions to take in response to correlated events being generated, thus producing an output stream 160 of correlated events and actions (e.g., system commands) from the event correlation runtime 150. For example, in various implementations, one or more of the correlated events in the output stream 160 may be fed back into the system through the event stream 120, wherein the correlated events provided back to the event stream 120 may be correlated with additional events or correlated events in the event stream 120.

Figure 2:
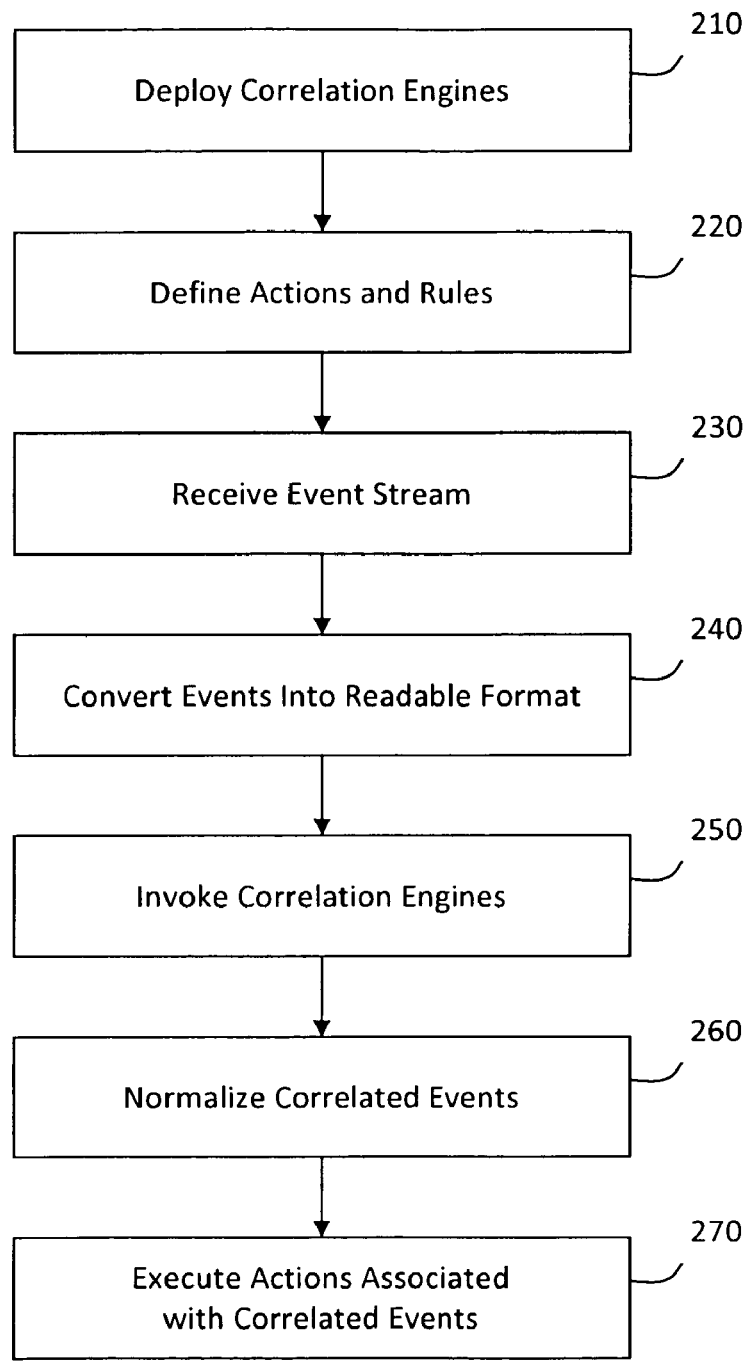
FIG. 2 illustrates a flow diagram of an exemplary process for correlating events in a pluggable event correlation system according to various aspects of the invention.

According to various aspects of the invention, as illustrated in FIG. 2, for example, a flow diagram of an exemplary process 200 for correlating events in a pluggable event correlation system may begin in an operation 210, where a plurality of correlation engines may be deployed into a correlation runtime environment. The deployed correlation engines may include various rules for determining when a given sequence or pattern of events should cause a correlated event to be generated.

Subsequently, in an operation 220, a user may define various customs rules that define event patterns, sequences, or other criteria for determining when a correlated event should be generated. The custom rules may be associated with predefined actions (e.g., system commands or responses), or custom actions may be defined to remediate the custom rules. Moreover, custom actions may be defined in operation 220 to be associated with predefined rules associated with the correlation engines deployed in operation 210. The rules and actions defined in operation 220 may be deployed into the correlation runtime environment to configure operation of one or more of the correlation engines. Prior to deploying the rules and actions, however, the rules and actions may be validated against semantic requirements of the correlation engines to ensure proper operation once deployed. As such, when the rules and actions defined in operation 220 have been validated and deployed into the runtime environment, the plurality of correlation engines previously deployed in operation 210 may be configured to enforce various rules, including predefined rules, custom rules, or various combinations thereof.

In an operation 230, an event stream containing a plurality of events may be received at the correlation runtime environment. The events may originate from various event sources (e.g., network nodes, devices, applications, etc.), and may be processed for analysis by the plurality of engines. For example, in a subsequent operation 240, the events in the event stream may be converted into one or more formats that can be read by the plurality of correlation engines. In particular, the plurality of correlation engines may accepts events to be correlated in various distinct formats. As such, in operation 240, the events in the event stream may be collected and filtered (e.g., to eliminate irrelevant data) prior to being normalized and enriched with information having business relevance (e.g., information describing the event, an originating event source, a policy to apply to the event, or other information). Various input adapters may be associated with the plurality of correlation engines, whereby the input adapters convert the enriched event stream into a format that can be used by the associated correlation engine.

The plurality of correlation engines may thus be invoked in an operation 250 to correlate the events subsequent to their conversion by the input adapters. Each of the correlation engines may evaluate the event stream in light of the rules that have been deployed in the correlation runtime environment for the particular correlation engine, including predefined rules, custom rules, or various combinations thereof. When a correlation engine determines in operation 250 that a given rule has triggered, a correlated event may be generated and the runtime environment may take further action to process the correlated event. For example, as the correlation engines may use various distinct formats, the correlated events generated thereby may be in various distinct formats. However, remedial actions deployed in the runtime environment may be associated with correlated events per a normalized event format. Thus, in an operation 260, various output adapters coupled to the correlation engines may convert outputs of the correlation engines into standard correlated events. Subsequently, in an operation 270, a determination may be made as to whether the correlated events normalized in operation 260 have actions associated therewith (e.g., a correlated event generated when a given rule triggers may be associated with a predetermined remedial action). Thus, the actions associated with the correlated events may be executed in operation 270 to take whatever remedial action may be necessary.

Implementations of the invention may be made in hardware, firmware, software, or various combinations thereof. The invention may also be implemented as instructions stored on a machine-readable medium, which may be read and executed by one or more processors. A machine-readable medium may include various mechanisms for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic has been described in connection with an aspect or implementation, it will be understood that such feature, structure, or characteristic may be included in connection with other aspects or implementations, whether or not explicitly described. Thus, various changes and modifications may be made to the preceding description without departing from the scope or spirit of the invention, and the specification and drawings should therefore be regarded as exemplary only, and the scope of the invention determined solely by the appended claims.

What is claimed is:

1. A method for correlating events in a pluggable event correlation system, comprising:

deploying a plurality of correlation engines into a correlation runtime environment having an extensible service-oriented architecture that includes an exposed application program interface to configure the correlation runtime environment with different semantic formats used in the plurality of correlation engines;

receiving an event stream that includes having a plurality of events that originate from a plurality of event sources;

converting the plurality of events in the event stream into the different semantic formats used in the plurality of correlation engines using a plurality of input adapters defined with the exposed application program interface;

correlating, the plurality of events against a plurality of rules using the plurality of correlation engines deployed into the correlation runtime environment, wherein the plurality of correlation engines evaluate the plurality of events in the different semantic formats used therein to correlate the plurality of events against the plurality of rules;

converting outputs that one or more of the plurality of correlation engines generated to indicate that one or more of the evaluated plurality of events have triggered one or more of the plurality of rules, wherein one or more output adapters defined with the exposed application program interface convert the outputs from the different semantic formats used in the one or more of the plurality of correlation engines into one or more correlated events associated with the correlation runtime environment; and executing one or more actions that the correlation runtime environment associates with the one or more correlated events to remediate a condition that caused the one or more of the plurality of correlation engines to indicate that the one or more of the plurality of rules have been triggered, wherein the one or more actions have a different format than the semantic formats used in the plurality of correlation engines.

2. The method of claim 1, wherein the plurality of rules include expressions that the plurality of correlation engines evaluate to determine whether the event stream includes one or more events that occurred in a predetermined pattern.

3. The method of claim 2, further comprising:
validating the plurality of rules per the different semantic formats used in the plurality of correlation engines; and
deploying the plurality of rules into the correlation runtime environment in response to validating the plurality of rules per the different semantic formats used in the plurality of correlation engines.

4. The method of claim 1, further comprising:
validating the one or more actions per the different semantic formats used in the plurality of correlation engines; and
deploying the one or more actions into the correlation runtime environment in response to validating the one or more actions per the different semantic formats used in the plurality of correlation engines, wherein the one or more deployed actions define the outputs that the one or more of the plurality of correlation engines generate to indicate that the one or more of the plurality of rules have been triggered.

5. The method of claim 1, further comprising managing the correlation runtime environment via a management module that provides an interface to start and stop the plurality of correlation engines.

6. A pluggable event correlation system, comprising:
a plurality of correlation engines deployed into a correlation runtime environment having an extensible service-oriented architecture, wherein the extensible service-oriented architecture includes an exposed application program interface to configure the correlation runtime environment with different semantic formats used in the plurality of correlation engines;
an input manager configured to:
receive an event stream having a plurality of events that originate from a plurality of event sources; and
convert the plurality of events in the event stream into the different semantic formats used in the plurality of correlation engines using a plurality of input adapters defined with the exposed application program interface;
an engine manager configured to start the plurality of correlation engines deployed into the correlation runtime environment to cause the plurality of correlation engines to correlate the plurality of events against a plurality of rules, wherein the plurality of correlation engines are configured to evaluate the plurality of events in the different semantic formats used therein to correlate the plurality of events against the plurality of rules;
one or more output adapters defined with the exposed application program interface, wherein the one or more output adapters are configured to:
receive outputs that one or more of the plurality of correlation engines generated to indicate that one or more of the plurality of events have triggered one or more of the plurality of rules; and
convert the outputs that the one or more of the plurality of correlation engines generated from the different semantic formats used therein into one or more correlated events associated with the correlation runtime environment;
an action manager configured to execute one or more actions that the correlation runtime environment associates with the one or more correlated events to remediate a condition that caused the one or more of the plurality of correlation engines to indicate that the one or more of the plurality of rules have been triggered;
a configuration module coupled to the correlation runtime environment, wherein the configuration module includes:
a rule builder configured to receive one or more rule definitions to define expressions associated with the plurality of rules via the exposed application program interface, wherein the plurality of correlation engines are further configured to evaluate the defined expressions associated with the plurality of rules to determine whether the event stream includes one or more events that occurred occur in a predetermined pattern; and
an action builder configured to receive one or more action definitions to define the one or more actions associated with the one or correlated events; and
a management module coupled to the configuration module and the correlation runtime environment, wherein the management module includes:
an engine manager configured to start and stop the plurality of correlation engines; and
a status module configured to display statistical information, status information, and health information associated with activity in the correlation runtime environment.

7. The system of claim 6, wherein the engine manager is further configured to:
validate the expressions defined with the rule builder per the different semantic formats used in the plurality of correlation engines; and
deploy the plurality of rules and the expressions associated therewith into the correlation runtime environment in response to validating the expressions defined with the rule builder per the different semantic formats used in the plurality of correlation engines.

8. The system of claim 6, wherein the one or more actions defined with the action builder have a different format than the semantic formats used in the plurality of engines.

9. The system of claim 6, wherein the engine manager is further configured to:
validate the one or more actions defined with the action builder per the different semantic formats used in the plurality of correlation engines; and
deploy the one or more actions into the correlation runtime environment in response to validating the one or more actions per the different semantic formats used in the plurality of correlation engines, wherein the one or more deployed actions define the outputs that the one or more of the plurality of correlation engines generate to indicate that the one or more of the plurality of rules have been triggered.

* * * * *